Aug. 18, 1931.  R. G. JONES  1,819,606

HYDRAULIC CLUTCH

Filed March 26, 1928  2 Sheets-Sheet 1

Inventor
Russell G. Jones
John L. Jackson
Attorney.

Witness
Milton Lenoir

Aug. 18, 1931.  R. G. JONES  1,819,606
HYDRAULIC CLUTCH
Filed March 26, 1928  2 Sheets-Sheet 2
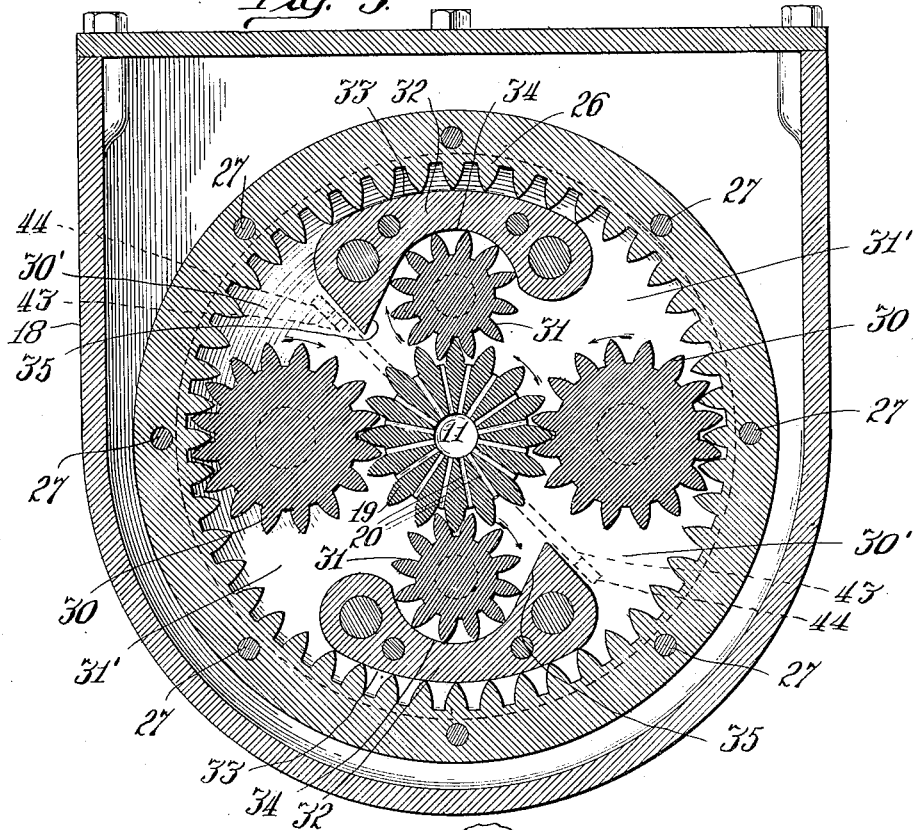
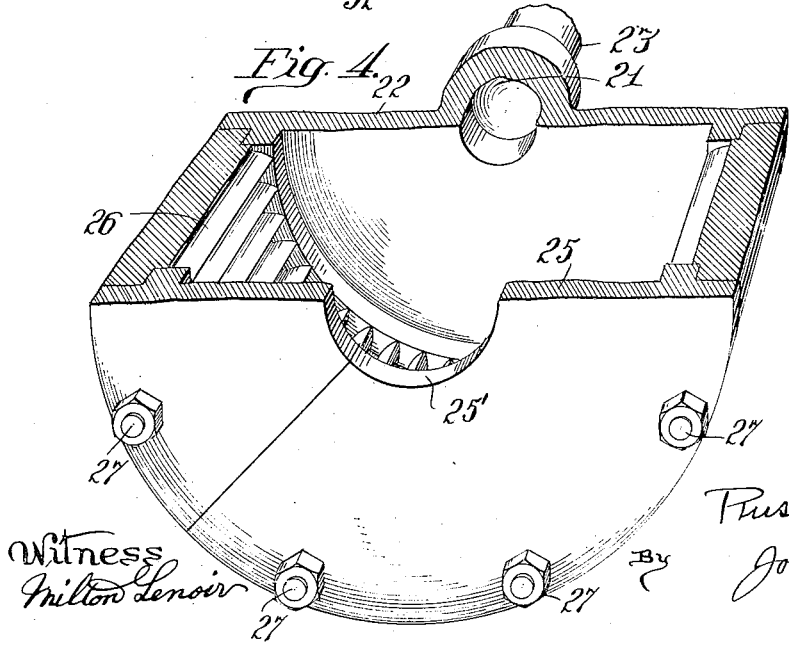
Inventor
Russell G. Jones
John L. Jackson
Attorney.
Witness
Milton Lenoir Patented Aug. 18, 1931

1,819,606

UNITED STATES PATENT OFFICE

RUSSELL G. JONES, OF VAN WERT, OHIO

HYDRAULIC CLUTCH

Application filed March 26, 1928. Serial No. 264,786.

My invention relates to improvements in hydraulic clutches and has for its primary object the provision of an improved construction of this character capable of economical manufacture and highly efficient in use.

Another object of the invention is the provision of a construction of this character by means of which the relative speed between any driving shaft, such as the shaft of an engine, turbine or motor, and any driven shaft, such as the rear axle driving shaft of an automobile, the propeller shaft of a boat, the shaft of an electric generator, or any other machine driven by power, may be varied gradually as desired.

Another object of the invention is to provide improved means for controlling the variation of speeds of transmission in such a device.

Another object of the invention is the provision of means of reversing the direction of revolution of any driven shaft while the driving shaft continues to revolve in the original direction.

Another object of the invention is to provide improved means for introducing liquid into such a construction during normal operation thereof.

Other objects will appear hereinafter.

The invention consists in the combinations and arrangements of parts hereinafter described and claimed.

The invention will be best understood by reference to the accompanying drawings forming part of this specification and in which—

Figure 1:
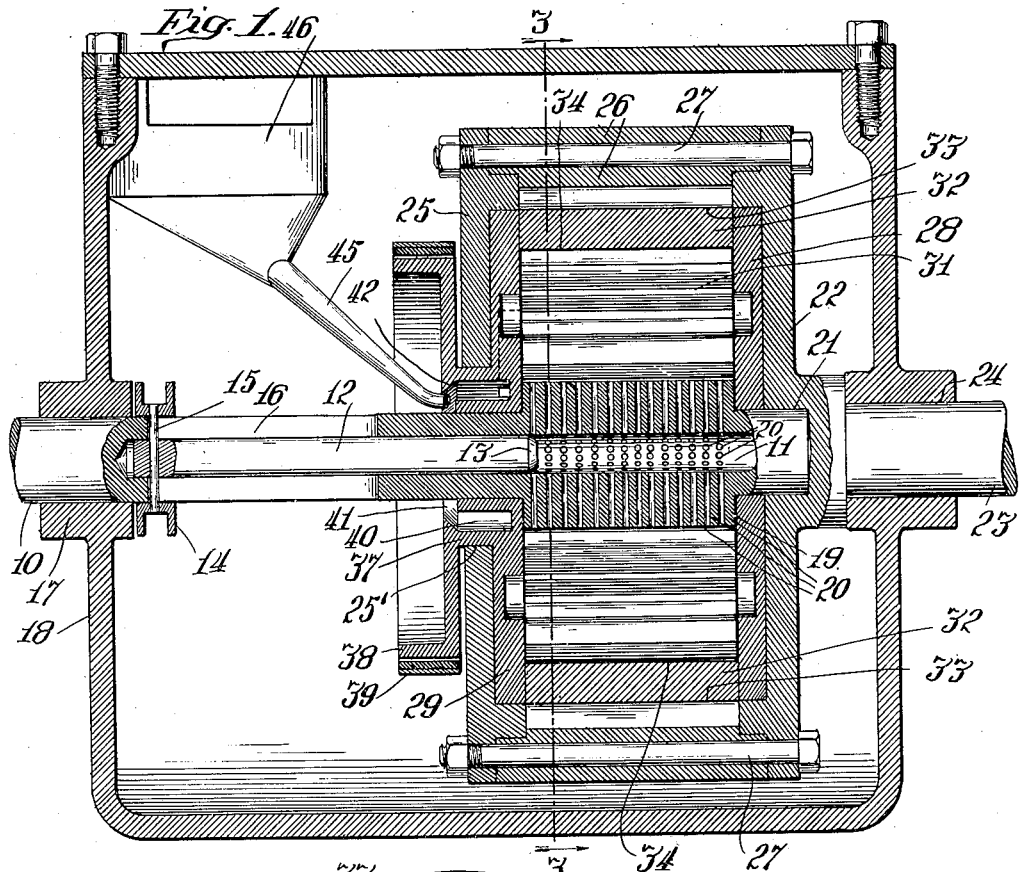
Figure 2:
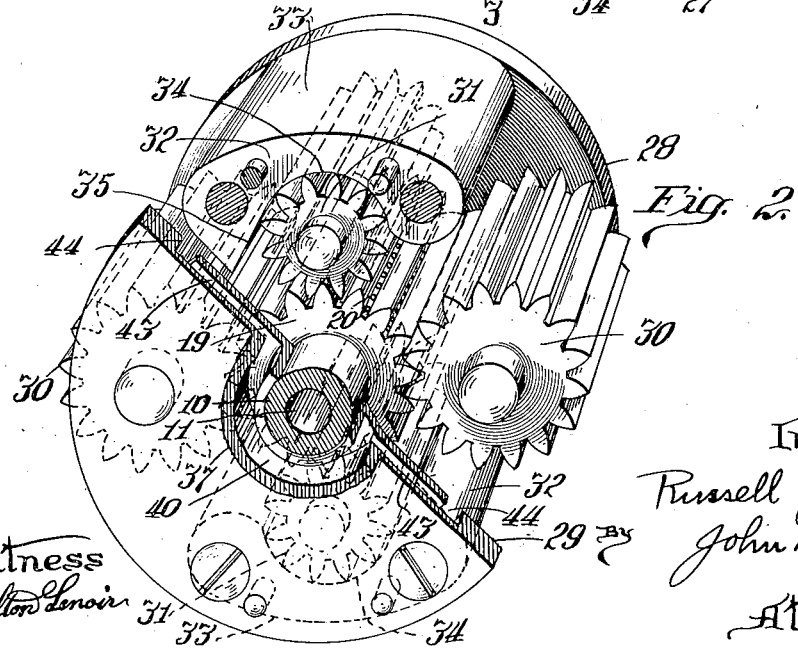

Fig. 1 is a vertical longitudinal section of a hydraulic clutch arrangement embodying the invention;

Fig. 2 a perspective view, with portions broken away and shown in section, of a planetary gear mounting employed in the construction;

Fig. 3 a section taken substantially on line 3—3 of Fig. 1; and

Fig. 4 a partial perspective view of the lower portion of a planetary gear casing employed in the construction.

The preferred form of construction, as illustrated in the drawings, comprises a driven shaft 10 having a central hollow bore 11 in one end thereof. A shiftable valve plunger 12 is arranged to reciprocate in the bore 11, said plunger 12 being provided with a tapered beveled nose or end 13. A grooved collar 14 is slidably mounted on shaft 10 and connected with the plunger 12 by means of a cross pin 15 passing through slots 16 in said shaft and whereby said valve plunger may be readily manipulated and adjusted in the bore of said shaft.

The shaft 10 is mounted in a suitable bearing 17 at one end of a housing 18, said shaft carrying at its inner end a sun spur gear 19, as shown. A plurality of sets of radial ports or passageways 20 are extended outwardly from the bore 11 into the bottoms of the spaces between the teeth of the spur gear 19 and whereby when said ports are open liquid may readily pass or flow through said ports and passages.

The extreme inner end of shaft 10 is mounted in a suitable bearing 21 in an end plate 22 of a planetary gear casing, said end plate 22 carrying an integral driven shaft 23 extending through a bearing 24 in the other end of the housing 18. The planetary gear casing comprises also another end plate 25 and an internal gear ring 26 secured in place between the end plates 22 and 25 by means of suitable bolts 27, thereby constituting a closed gear casing surrounding and enclosing the sun gear 19.

A planetary gear carrier is arranged to revolve freely in the gear casing thus provided, said carrier comprising end plates 28 and 29 having larger planetary gears 30 mounted therein, as shown, upon suitable trunnions and bearings to mesh with diametrically opposite sides of the central sun gear 19 and the internal gear 26, as shown.

Another pair of smaller planetary gears 31 are also mounted between the plates 28 and 29 to rotate freely and to mesh with the teeth of the sun gear 19 at diametrically opposite points located centrally between the gears 30, said smaller gears 31, however, meshing only with the sun gear and being entirely free of the internal gear 26.

Sealing blocks 32 are mounted, as shown, between the gears 31 and the gear 26, said blocks 32 being provided with outer cylindrical surfaces 33 closely fitting the inner edges of the teeth of the gear 26 and also with inner recesses 34 closely fitting the outer edges of the teeth on the gears 31, so as to form substantially effective seals between the chambers 30' and 31' thus provided in the gear casing between said gears and blocks, there being two oppositely disposed chambers 30' and two oppositely disposed chambers 31', as best shown in Fig. 3. Each recess 34, on the side leading from the corresponding chamber 30' is provided with a beveled entry 35 to facilitate entry of liquid from said chamber to the recesses between the teeth. By this arrangement when the sun gear 19 is rotated in a counter-clock-hand-wise direction, as indicated by the arrow in Fig. 3, the planetary gears 30 and 31 will, of course, be operated in the reverse direction as indicated.

Assuming that the shaft 23 is the driven shaft of the device and carries the load to be operated, the internal gear 26 will normally be held stationary by the effect of this load and whereby when the clutch is idling, the gears 30 will be caused to travel or revolve around the inner side of the gear 26 in a counter-clock-wise direction owing to the "walking" action of said gears on the stationary internal gear 26. The effect of this will be to carry the entire planetary gear mounting around in said casing. The casing is filled with oil or other suitable liquid and, it will be noted, that the effect of such travel will be to transfer said oil in the spaces between the teeth of the gear 26 and the gears 31 from the chambers 30' into the chambers 31'. The chambers 31' being already filled with the oil this will cause said oil to flow back through the ports or passageways 20 and bore 11 into the chambers 30', thus maintaining said chambers completely filled with the oil. This is the idling position and action of the parts.

When it is desired to exert power upon the driven shaft 23, the plunger 12 is shifted to the right to close the ports 20 so as to prevent or interfere with this free circulation of the oil between the chambers 31' and 30'.

To render the action clear, we will assume that the plunger 12 has been shifted to its extreme position at the right, thereby completely closing all of the ports 20. When all of the ports 20 are completely closed, the flow of oil therethrough from the chambers 31' to the chambers 30' is completely stopped. Said chambers 31' being already filled with oil cannot receive any more from the chambers 30' due to the above described action of the teeth of the gears 31 and 26 and therefore said gears must cease to function. This stops the rotation of said gears and has the effect of positively locking the drive shaft 10 to the driven shaft 23, compelling rotation of the latter at the same speed as the former.

When it is desired to vary the speed between the shafts 10 and 23, the valve plunger 12 is shifted to an intermediate position to open more or less of the ports and passages 20. The opening of a few of the ports 20 will permit the flow of a relatively small quantity of oil between the chambers 30' and 31', as above described, and therefore will permit of a slight slipping or lagging behind of the shaft 23, so that said shaft 23 will be rotated at slightly less speed than the shaft 10. The opening of more of the ports 20 will permit of more rapid flow of the oil and therefore of greater lagging behind of the shaft 23, until the extreme left hand position of the valve plunger 12 is reached when, as explained above, the shaft 10 will rotate idly, permitting the shaft 23 to remain stationary. The beveled end or nose 13 of the valve plunger 12 has the effect of rendering the transition from one set of ports to another more gradual and uniform, said beveled nose partially uncovering or partially interfering with each set of ports as the valve plunger is shifted.

As the valve plunger 12 is moved to the right the ports 20 will be gradually closed thus gradually interfering with the flow of oil and causing the shaft 23 to gradually increase in speed until the full speed of shaft 10 is reached when all of said ports are closed. With this device, it is possible, therefore, to vary the relative speed of the driving and driven shafts by no other action than moving the control valve plunger 12 so as to close or open the ports 20. As the number of ports is many, the variation in speed will be gradual rather than sudden, and the tapered or beveled end of the plunger 12 has the effect of rendering said variations of speed practically uniform.

The end plate 25 of the gear casing is provided with a central hub 37 projecting through a corresponding opening or bearing 25' in the end plate 25, and a friction wheel or pulley 38 is mounted on said hub to cooperate with friction bands 39 by means of which said planetary gear plates 28 and 29 may be locked and held from rotation. When the planetary gearing is thus locked and held from rotation and the valve plunger 12 is shifted to permit free flow of the oil, the planetary gears 30 will operate as simple transmission gears and cause the internal gear 26 to revolve in a reverse direction, thus reversing the direction of rotation of shaft 23. This furnishes a simple and convenient means for reversing the direction of rotation of the driven shaft, the advantages and functions of which are obvious.

Owing to the movement of the parts and the ineffective sealing action possible there will be in use more or less leakage of the oil from the interior of the planetary gear casing. This oil will collect in the lower portion of the housing 18 which is shaped to fit substantially the lower portion of the gear casing, and automatic means are provided for returning said oil to the interior of the gear casing. To this end the hub 37 is provided with an annular oil chamber 40 having an entry opening 41 adjacent the shaft 10, the outer edge 42 of said entry opening being beveled or tapered, as shown, so that the effect of the centrifugal force on oil deposited in the opening 41 is to throw the oil outwardly into the oil chamber 40. Suitable radial passages 43 lead from the chamber 40 to ports 44 which open into the chambers 30' so that oil entering the entry opening 41 will be thrown outwardly by the centrifugal force into the chambers 30'. An oil spout 45 leads into the entry opening 41, as shown, from a suitable oil hopper or receptacle 46 so that the oil in the bottom of the housing 18 picked up by the rotation of the gear casing and splashed against the top of said housing will ultimately find its way into the reservoir 46 and thence into the entry opening 41 whence it will be returned to the chambers 30', as explained above. In this way any oil leaking or escaping from the gear casing will be automatically returned thereto during the operation of the mechanism.

While I have illustrated and described the preferred form of construction for carrying my invention into effect, this is capable of variation and modification. I therefore do not wish to limit myself to the precise embodiment disclosed but desire to avail myself of such variations and modifications as fall within the scope of the appended claims.

I claim:

1. A hydraulic clutch comprising a hollow shaft; a sun gear on said shaft, there being ports leading from the spaces between the teeth of said gear into the hollow bore of said shaft; a shiftable valve plunger in said bore arranged to open and close said ports; planetary gearing revolving about about and meshing with said sun gear; a casing enclosing said planetary gearing; an internal gear on said casing meshing with said planetary gearing, said casing being filled with liquid; and a shaft attached to said casing in alinement with said first mentioned shaft.

2. A hydraulic clutch comprising a hollow shaft; a sun gear on said hollow shaft, there being ports leading from the spaces between the teeth of said gear into the hollow bore of said shaft; a shiftable valve plunger in said bore arranged to open and close said ports; a second shaft in alignment with said hollow shaft; a casing on said second shaft enclosing said sun gear; an internal gear on said casing surrounding said sun gear; and planetary hydraulic clutch gearing in said casing meshing with said sun and internal gears, said casing being filled with liquid.

3. A hydraulic clutch comprising a hollow shaft; a sun gear on said hollow shaft, there being ports leading from the spaces between the teeth of said gear into the hollow bore of said shaft; a shiftable valve plunger in said bore arranged to open and close said ports; a second shaft in alignment with said hollow shaft; a casing on said second shaft enclosing said sun gear; an internal gear on said casing surrounding said sun gear; a pair of oppositely disposed planetary gears mounted to revolve freely in said casing, each of said planetary gears meshing with said sun and internal gears; a pair of smaller planetary gears mounted between and to revolve with said first mentioned gears, said smaller planetary gears meshing with opposite sides of said sun gear; and sealing blocks interposed between said smaller planetary gears and the adjoining portion of said internal gear, said casing being filled with liquid.

4. A hydraulic clutch comprising a hollow shaft; a sun gear on said hollow shaft, there being ports leading from the spaces between the teeth of said gear into the hollow bore of said shaft; a shiftable valve plunger in said bore arranged to open and close said ports; a second shaft in alignment with said hollow shaft; a casing on said second shaft enclosing said sun gear; an internal gear on said casing surrounding said sun gear; planetary hydraulic clutch gearing in said casing meshing with said sun and internal gears, said casing being filled with liquid; and a brake member operatively connected with said planetary gears to lock the same against revolution.

5. A hydraulic clutch comprising a hollow shaft; a sun gear on said hollow shaft, there being ports leading from the spaces between the teeth of said gear into the hollow bore of said shaft; a shiftable valve plunger in said bore arranged to open and close said ports; a second shaft in alignment with said hollow shaft; a casing on said second shaft enclosing said sun gear; an internal gear on said casing surrounding said sun gear; a pair of oppositely disposed planetary gears mounted to revolve freely in said casing, each of said planetary gears meshing with said sun and internal gears; a pair of smaller planetary gears mounted between and to revolve with said first mentioned gears, said smaller planetary gears meshing with opposite sides of said sun gear; sealing blocks interposed between said smaller planetary gears and the adjoining portion of said internal gear, said casing being filled with liquid; and a brake member operatively connected with said planetary gears to lock the same against revolution.

6. A hydraulic clutch comprising a hollow shaft; a sun gear on said hollow shaft, there being ports leading from the spaces between the teeth of said gear into the hollow bore of said shaft; a shiftable valve plunger in said bore arranged to open and close said ports; a second shaft in alignment with said hollow shaft; a casing on said second shaft enclosing said sun gear; an internal gear on said casing surrounding said sun gear; planetary hydraulic clutch gearing in said casing meshing with said sun and internal gears, said casing being filled with liquid; an outer housing enclosing said casing; and means for automatically transferring liquid from said housing to the interior of said casing.

7. A hydraulic clutch comprising a hollow shaft; a sun gear on said hollow shaft, there being ports leading from the spaces between the teeth of said gear into the hollow bore of said shaft; a shiftable valve plunger in said bore arranged to open and close said ports; a second shaft in alignment with said hollow shaft; a casing on said second shaft enclosing said sun gear; an internal gear on said casing surrounding said sun gear; a pair of oppositely disposed planetary gears mounted to revolve freely in said casing, each of said planetary gears meshing with said sun and internal gears; a pair of smaller planetary gears mounted between and to revolve with said first mentioned gears, said smaller planetary gears meshing with opposite sides of said sun gear; sealing blocks interposed between said smaller planetary gears and the adjoining portion of said internal gear, said casing being filled with liquid; a brake member operatively connected with said planetary gears to lock the same against revolution; an outer housing enclosing said casing; and means for automatically transferring liquid from said housing to the interior of said casing.

8. A hydraulic clutch comprising a shaft; a sun gear on said shaft; a second shaft in alignment with said first mentioned shaft; a casing on said second shaft enclosing the end of said first shaft; a sun gear on said first mentioned shaft within said casing; an internal gear on said casing surrounding said sun gear; a pair of oppositely disposed planetary gears mounted to revolve freely in said casing, each of said planetary gears meshing with said sun and internal gears; a pair of smaller planetary gears mounted between and to revolve with said first mentioned gears, said smaller planetary gears meshing with opposite sides of said sun gear; sealing members interposed between said smaller planetary gears and the adjoining portion of said internal gear, said casing being filled with liquid and there being passages interconnecting the spaces between said planetary gears; and means for conrolling the passage of liquid through said passages.

9. A hydraulic clutch comprising a shaft; a rotatable casing surrounding said shaft; planetary hydraulic clutch gearing in said casing, said casing being filled with liquid; an annular chamber in said casing surrounding said shaft; means operating through centrifugal force for introducing liquid into said annular chamber; and radial passageways leading from said annular chamber to the interior of said casing.

10. A hydraulic clutch comprising a shaft; a rotatable casing surrounding said shaft; planetary hydraulic clutch gearing in said casing, said casing being filled with liquid; an annular chamber in said casing surrounding said shaft; means operating through centrifugal force for introducing liquid into said annular chamber; radial passageways leading from said annular chamber to the interior of said casing; a housing enclosing said casing, the lower portion of said housing being formed into a well retaining liquid leaking from said casing; a reservoir in the upper portion of said housing to receive liquid thrown therein by centrifugal force from said casing; and means for conducting liquid from said reservoir to the means supplying said annular chamber therewith.

11. A hydraulic cluch comprising driving and driven shafts, a central gear mounted on one of said shafts to rotate therewith, a casing mounted on the other of said shafts to rotate therewith and surrounding said central gear, a pair of planetary gears mounted in said casing and meshing with said central gear, a pair of intake chambers connecting respectively with each of said planetary gears, and with said central gear, a pair of exhaust chambers connecting respectively with each of said planetary gears and with said central gear, means providing communication between said intake and exhaust chambers, and valve means mounted in one of said shafts for controlling communication between said intake and said exhaust chambers.

In witness that I claim the foregoing as my invention, I affix my signature this 8 day of March, 1928.

RUSSELL G. JONES.